Patented May 20, 1952

2,597,469

UNITED STATES PATENT OFFICE 2,597,469

PROCESS FOR PRODUCING ARTIFICIAL CERAMIC TEETH

Konrad Gatzka, Sprendlingen/Kreis Offenbach, Germany, assignor to Zahnfabrik Wienand Soehne und Co., G. m. b. H., Sprendlingen, Germany, a corporation of Germany No Drawing. Application September 10, 1949, Serial No. 115,107. In Switzerland May 19, 1949

22 Claims. (Cl. 25—156)

For several years attempts have been made to manufacture ceramic artificial teeth with a translucency approaching that of natural teeth. In all attempts, however, it was shown that even glass-clear raw materals after the necessary grinding, mixing and compounding with accessory materials such as pigmenting, plasticizing, and binding substances, as is required for the manufacture of a mineral tooth, cannot be fired together again into corresponding glass-clear bodies. The fired bodies thus prepared exhibited a substantial degree of cloudiness. Experience taught only that it was possible to obtain an increase in the translucency through a particular assortment of grain sizes. Very coarse-grained mixtures had to be used to secure fired bodies of desired translucency. These are, however, disadvantageous for various reasons. Firstly they are difficult to process and then the nature-like appearance of the fired body suffers from the fact that because of the coarsening of the particles of the mass, the fired body appears inhomogeneous. The relatively large and coarse particles of the mass produce an irregular distribution of air bubbles and pigment and a fired body of sufficient translucency has a sandy, gritty appearance. One was therefore confronted with the choice of manufacturing either a fired body with increased translucency but a sandy, gritty and inhomogeneous appearance by using coarse-grained particles, or a fired body of finely-powdered particles of a more opaque appearance.

In judging the quality of a mineral tooth, strength also is to be considered. The glass fluxes utilized to secure a high translucency always produced a reduction in strength in comparison with opaque masses, since strength depends on additions of, for example, quartz, aluminum oxide, steatite, which in themselves have a strong clouding effect. Thus strength on the one hand and translucency on the other hand were two antagonistic requirements which could be reconciled only through a compromise.

Finally, in judging a tooth porcelain its capacity to be ground and polished is of significance. It was demonstrated that in particular with translucent fired bodies the porcelain exhibits relatively large pores after grinding or polishing and must be submitted to a subsequent glazing to obtain smooth shining surfaces after grinding.

In considering the cause of the low translucency of fired tooth bodies manufactured from ceramic particles, the following is of interest.

If firing is considered as a physical process there is involved in the raw product, for example in a baked raw tooth, primarily a twophase system of the type—gaseous : solid—in which a part of the gaseous phase is joined as an adsorptive to the mineral powder acting as adsorbent. In other words, the baked raw tooth, after the burning out of the organic binder if such has been used, consists of an assortment of odd shaped ceramic grains of the ingredients having hollows and gaps dispersed throughout said assortment. Hollows or gaps are the crevices or interstitial spaces between grains which may originate from three different sources: (a) the inability to completely fill a given volume with an assortment of irregularly shaped grains. (b) space originally occupied by binder material, and (c) air bubbles entrapped in the compounding or forming of the plastic mass into a tooth shape. In general, the number of hollows or gaps is inversely proportional to the grain size of the ceramic particles and the size of the hollows is directly proportional to the grain size. The size and number of hollows in turn primarily determines the size and number of gas bubbles in the finished product. The reduction in the adsorption resulting from the heating, as well as the thinning of the gas or air occurring with increasing heat, normally does not eliminate the gaseous phase of the teeth to a desired degree. During the firing or shrinkage process, which is conventionally conducted in a furnace atmosphere of substantially air, the gas or air in the hollows is entrapped and can escape either not at all or to an insufficient degree. The imprisoned particles of gas or air in the hollows are pressed together during the fusion stage of firing, after a sufficient viscosity of the ceramic material has been reached under the action of surface tension into bubbles, whereby the finished product receives its strongly clouded appearance. While being so fused, the baked raw tooth shrinks to the size of the finished tooth.

Starting from these considerations I found that fired ceramic teeth having a high, indeed even complete translucency, can be manufactured in two different ways.

One method consists in firing baked raw teeth such as defined above under reduced atmospheric pressure, for example under the vacuum produced by a water pump. The gases present in the gaps in the grain dispersion are thereby removed, as well as the adsorptively joined gases released during the firing process.

I also have found that the degree of cloudiness may be regulated by altering the degree of vacuum. The strength of the cloudiness from gas bubbles is in direct relation to the pressure existing during the firing process. In this manner every degree of translucency from a completely opaque fired body up to a completely glass-clear fired body, may be manufactured from only one mass simply by regulating the degree of vacuum.

Another method is to use during the sintering of the baked raw teeth a gas atmosphere in the furnace which has a greater degree of diffusion capacity than air, and which under the influence of pressure arising from the increase in surface tension during the sintering of the raw teeth diffuse outwards to the outside. Appropriate gases are those with a high diffusion capacity. Examples of such are those with low atomic or molecular size, such as helium, hydrogen and steam.

To obtain partial translucency one can proceed in such a manner that the firing occurs in an atmosphere of a gas mixture partly of a high and partly of a low diffusion capacity. An appropriate gas mixture can, for example, comprise 40% helium and 60% air, or 20% air and 80% steam.

As a variation on the foregoing working processes, one can also maintain (simultaneously) during the firing both an atmosphere of gases with a high diffusion capacity and reduced pressure.

The foregoing methods have the following advantages: A complete union of the individual ceramic particles is effected. The hollows which occur in the mass in the course of the preparation and in the manufacture of the raw product, for example through poor packing or burning out the auxiliary materials, are also eliminated. The fired body is completely homogeneous, and if a glass-clear primary material without pigments or clouding media is used and worked under strongly reduced pressure or in the presence of highly diffusible gases, it becomes glass-clear again after firing. For many purposes, particularly for ceramic tooth purposes, glass-clear translucency is not necessary or not desired. Consequently, to secure an opaque background clouding materials or pigments can be added to the ceramic mass with the advantage that clouding materials with particular optical or strength effects can be selected. The particle size of the clouding materials may be less than the size of the previously present gas bubbles which were principally previously responsible for the clouding.

The action of the pigment bodies can take better effect due to the fact that no gas enclosures which weaken the shade effect are present between the surface of the ceramic body and the pigment bodies. It is consequently possible to use a larger addition of pigment bodies of less color intensity and in this way secure a more even coloration.

The finest milled masses as well as coarse masses may be used equally well. Further, the coarse materials used hitherto to which plasticizers had to be added may now be converted into plastic masses by appropriate reduction in size. The possibility of making practical use of the finest particles brings with it the advantage of securing a better union of the particles with each other whereby better homogeneity of the fired body is obtained. The possibility of using fine and finest particles also has an advantageous effect in that in comparison with masses with larger particles the firing temperature may be lowered and the firing time shortened and a smooth surface obtained more rapidly. The complete homogeneity thus achieved makes possible a polish after grinding which approaches in surface smoothness the glaze produced by firing. In porcelain teeth the formerly necessary ceramic glazing of ground spots to be in contact with mucous membrane is eliminated.

I claim:

1. A process for producing an artificial ceramic tooth substantially free from bubbles and having translucency resembling that of natural teeth, said process comprising the steps of pre-forming ceramic particles into a raw tooth having a pre-determined shape, placing said pre-formed raw tooth within a furnace compartment in a substantially freely exposed condition, surrounding said raw tooth with an atmosphere within said compartment conducive to the withdrawal of substantially all bubble forming gases from said tooth, and while said raw tooth is surrounded by said atmosphere subjecting it to a temperature sufficient to fuse together the particles thereof into a homogeneous and dense artificial ceramic tooth substantially free from bubbles and having approximately the translucency of a natural tooth and the shape of the raw tooth except for a uniform pre-determined shrinkage, said fused tooth when glazed being grindable to change the shape thereof and such ground surface being favorably comparable in surface smoothness to the glazed surface of said tooth.

2. Process according to claim 1 characterized by firing under reduced atmospheric pressure.

3. Process according to claim 1 characterized by firing under the vacuum produced by a water jet pump.

4. Process according to claim 1 characterized by firing in the presence of an atmosphere of gaseous substances having a high diffusion capacity.

5. Process according to claim 1 characterized by firing in the presence of helium.

6. Process according to claim 1 characterized by firing in the presence of hydrogen.

7. Process according to claim 1 characterized by firing in the presence of steam.

8. Process according to claim 1 characterized by firing in the presence of a mixture of helium and hydrogen.

9. Process according to claim 1 characterized by firing in the presence of a mixture of helium and steam.

10. Process according to claim 1 characterized by firing in the presence of a mixture of hydrogen and steam.

11. Process according to claim 1 characterized by firing in the presence of a mixture of helium, hydrogen and steam.

12. Process according to claim 1 characterized by firing in a partial atmospheric vacuum to secure partial translucency.

13. Process according to claim 1 characterized by firing in a mixed atmosphere of gaseous substances of low and high diffusion capacity to secure partial translucency.

14. Process according to claim 1 characterized by firing in the presence of a mixture of air and helium.

15. Process according to claim 1 characterized by firing in the presence of a mixture of air and steam.

16. Process according to claim 1 characterized by firing in the presence of a mixture of air, helium and steam.

17. Process according to claims 5, 6 or 7 characterized further by firing under a pressure lower than atmospheric pressure.

18. A process for producing an artificial ceramic tooth substantially free from bubbles and having translucency resembling that of natural teeth, said process comprising the steps of pre-forming ceramic particles and auxiliary materials into a raw tooth having a predetermined shape, burning out the auxiliary materials to produce a baked raw tooth, and thereafter surrounding said baked raw tooth, within a furnace compartment in which said tooth is arranged in a substantially freely exposed condition, with an atmosphere conducive to the withdrawal of substantially all bubble forming gases from said tooth, and while said pre-formed baked raw tooth is surrounded by said atmosphere subjecting it to a temperature sufficient to fuse together the particles thereof into a homogeneous and dense artificial ceramic tooth substantially free from bubbles and having approximately the translucency of a natural tooth and the shape of the pre-formed baked raw tooth except for a uniform pre-determined shrinkage, said fused tooth when glazed being grindable to change the shape thereof and such ground surface being favorably comparable in surface smoothness to the glazed surface of said tooth.

19. Process according to claim 18 characterized by firing under reduced atmospheric pressure.

20. Process according to claim 18 characterized by firing in the presence of an atmosphere of gaseous substance having a high diffusion capacity.

21. Process according to claim 18 characterized by firing in the presence of helium.

22. Process according to claim 18 characterized by firing in the presence of steam.

KONRAD GATZKA.

REFERENCES CITED

The following references are of record in the file of this patent:

UNITED STATES PATENTS

| Number | Name | Date |
| --- | --- | --- |
| 1,549,591 | McCullough | Aug. 11, 1925 |
| 2,097,620 | Harris | Nov. 2, 1937 |
| 2,128,289 | Dubilier et al. | Aug. 30, 1938 |